United States Patent
Schroeter et al.

(10) Patent No.: US 10,317,868 B2
(45) Date of Patent: Jun. 11, 2019

(54) SYSTEM AND METHOD FOR TESTING A DISTRIBUTED CONTROL SYSTEM OF AN INDUSTRIAL PLANT

(71) Applicant: ABB TECHNOLOGY AG, Zurich (CH)

(72) Inventors: Ben Schroeter, Heidelberg (DE); Fan Dai, Zwingenberg (DE); Hao Ding, Heidelberg (DE); Mario Hoernicke, Landau (DE); Nicolas Mauser, Mannheim (DE); Peter Weber, Limburgerhof (DE)

(73) Assignee: ABB SCHWEIZ AG, Baden (CH)

( * ) Notice: Subject to any disclaimer, the term of this patent is extended or adjusted under 35 U.S.C. 154(b) by 261 days.

(21) Appl. No.: 14/773,403

(22) PCT Filed: Jan. 25, 2014

(86) PCT No.: PCT/EP2014/000198
§ 371 (c)(1),
(2) Date: Sep. 8, 2015

(87) PCT Pub. No.: WO2014/139616
PCT Pub. Date: Sep. 18, 2014

(65) Prior Publication Data
US 2016/0033952 A1 Feb. 4, 2016

(30) Foreign Application Priority Data

Mar. 12, 2013 (EP) .................................... 13158695

(51) Int. Cl.
*G06F 19/00* (2018.01)
*G05B 19/048* (2006.01)
*G05B 19/418* (2006.01)

(52) U.S. Cl.
CPC ..... *G05B 19/048* (2013.01); *G05B 19/41885* (2013.01); *G05B 2219/24058* (2013.01);
(Continued)

(58) Field of Classification Search
None
See application file for complete search history.

(56) References Cited

U.S. PATENT DOCUMENTS 5,752,008 A * 5/1998 Bowling ................ G05B 17/02
700/83
6,223,202 B1 * 4/2001 Bayeh ................... G06F 9/5027
718/1
(Continued)

FOREIGN PATENT DOCUMENTS

DE 102010025954 * 1/2012 ....... G05B 19/41885
DE 102010025954 A1 1/2012
(Continued)

OTHER PUBLICATIONS

Abb Tech System 800xA Server Node Virtualization with VMware vSphere ESX.*
(Continued)

*Primary Examiner* — Brian W Wathen
*Assistant Examiner* — Hung H Dang
(74) *Attorney, Agent, or Firm* — Leydig, Voit & Mayer, Ltd.

(57) ABSTRACT

A system for testing a distributed control system of an industrial plant is provided. The distributed control system includes at least two industrial control devices and at least one data communication device. The system includes at least one engineering computer that includes an engineering data storage unit for storing engineering data of at least one part of the distributed control system, and at least one human machine interface for manipulating the engineering data.
(Continued)

The system also includes at least one remote data processing server connected to the at least one engineering computer via a remote data connection and including an emulating virtual machine on which a soft emulator is installed for emulating one of the at least two industrial control devices and the at least one data communication device.

12 Claims, 5 Drawing Sheets

(52) U.S. Cl.
CPC ............ *G05B 2219/31018* (2013.01); *G05B 2219/32345* (2013.01); *Y02P 90/12* (2015.11); *Y02P 90/18* (2015.11); *Y02P 90/26* (2015.11)

(56) References Cited

U.S. PATENT DOCUMENTS

| | | | | |
|---|---|---|---|---|
| 2009/0089700 A1* | 4/2009 | Gu | .................. | G05B 19/41885 715/771 |
| 2009/0292514 A1* | 11/2009 | McKim | .................... | G09B 9/00 703/6 |
| 2010/0017800 A1* | 1/2010 | Dow | .................. | G06F 9/45533 718/1 |
| 2011/0010691 A1* | 1/2011 | Lu | ....................... | G06F 11/3688 717/124 |
| 2011/0022694 A1* | 1/2011 | Dalal | .................. | H04L 41/0843 709/222 |
| 2011/0078675 A1* | 3/2011 | Van Camp | ................ | G06F 8/65 717/170 |
| 2011/0083122 A1* | 4/2011 | Chen | ................... | G06F 11/3664 717/124 |
| 2011/0131017 A1* | 6/2011 | Cheng | ............. | G05B 19/41885 703/2 |
| 2011/0239214 A1* | 9/2011 | Frields | ................ | G06F 9/45533 718/1 |
| 2012/0054551 A1* | 3/2012 | Gao | .................... | G06F 11/3664 714/38.1 |

FOREIGN PATENT DOCUMENTS

| EP | 1659468 A1 | 5/2006 | |
|---|---|---|---|
| EP | 1906377 A1 * | 4/2008 | .............. G09B 5/00 |
| EP | 2508954 A1 | 10/2012 | |

OTHER PUBLICATIONS

Hoernicke M et al: "Effizientes Testen heterogener Leitsystemkonfigurationen. Integration gewerkeübergreifender Hardware-Emulatoren", Automatisierungstechnische Praxis—ATP, Oldenbourg Industrieverlag; Munchen; DE; No. 11; Nov. 1, 2012 (Nov. 1, 2012), pp. 46-54, XP009171585.

Mahalik N G PC et al: .,Design and development of system level software tool for DCS simulation, Advances in Engineering Software, Elsevier Science, Oxford, GB, vol. 34, No. 7, Jul. 1, 2003 (Jul. 1, 2003), pp. 451-465, XP002575547.

Drath R et al: "An evolutionary approach for the industrial introduction of virtual commissioning", Emerging Technologies and Factory Automation, 2008, IEEE International Conference, Sep. 15, 2008 (Sep. 15, 2008), pp. 5-8, XP031344576.

* cited by examiner

SYSTEM AND METHOD FOR TESTING A DISTRIBUTED CONTROL SYSTEM OF AN INDUSTRIAL PLANT

CROSS REFERENCE TO RELATED APPLICATIONS

This application is a U.S. National Phase application under 35 U.S.C. § 371 of International Application No. PCT/EP2014/000198 (WO 2014/139616 A1), filed on Jan. 25, 2014, and claims benefit to European Patent Application No. EP 13158695.0, filed Mar. 12, 2013.

FIELD

The invention relates to a system and method for testing a distributed control system of an industrial plant.

BACKGROUND

A distributed control system (DCS) is a control system consisting of multiple control devices which are distributed throughout an industrial plant, where the industrial plant may belong to different industry sectors, such as the process industry like pharmaceutical and chemical industry, or the discrete manufacturing industry, or the mineral and oil and gas industry, or the power generation industry.

The DCS comprises at least two industrial control devices, each of them being arranged to control operation of a respective actuating part of the industrial plant during a production process of the industrial plant, where the actuating parts may be, for example, single actuators such as a motor, a pump, a valve or a switch, groups of actuators, or a whole operational section of the industrial plant. In order to be able to control the corresponding at least one actuator, each control device is arranged to receive or determine state information about a current operational state of the respective actuating part of the industrial plant, where the state information is generated directly from measurements taken by at least one sensor, or indirectly, by estimating the state information from available further state information. The DCS further comprises at least one data communication means arranged to connect each of the at least two industrial control devices with at least the respective actuating part of the industrial plant. The data communication means are preferably wire-bound or wireless field busses, applying protocols such as Foundation Fieldbus, Profibus and Profinet or IEC61850.

Before the parts of a new or amended DCS are delivered to and/or installed in the actual industrial plant, their operation needs to be tested during a so called Factory Acceptance Testing (FAT). This is commonly performed in a dedicated test environment which contains certain samples of the hardware to be expected in the industrial plant. However, it is never possible to provide more than a sub-system of the industrial plant and the corresponding—already tested—parts of the DCS for testing a particular control device. In particular, peripheral components of the DCS, such as field bus components, are usually sent directly to the site due to reasons of easier logistics and economy of time. However, in order to ensure that the whole DCS works correctly and fulfills all specifications, it is desirable to test as many parts of the DCS in a concurrent test procedure as possible, notwithstanding the above described hardware limitations in the test environment.

In an article by M. Hoernicke et al: "Effizientes Testen heterogener Leitsystemkonfigurationen," it is described that the hardware limitations during FAT are overcome by using simulation in order to reproduce the dynamic behavior of the production processes performed in the industrial plant, and by using emulation for those parts of the DCS which are not available in hardware. The simulation is commonly based on a computer-implemented model of the dynamic system behavior of the operational elements of the industrial plant, thereby modeling the production processes performed in the plant. In the simulation model, the output signals, i.e. the actuating signals, of the control devices are used as input variables, and at least some of the operational states of the industrial plant represent the output variables.

The emulation of the elements of the DCS is performed by executing the original computer programs written for the control devices and the data communication means of the DCS on alternative hardware devices than the original hardware devices used in the industrial plant, where the alternative hardware devices mimic the computational and processing related behavior of the original hardware. The alternative hardware devices may for example be a so called emulating computer device having a higher processing power than a typical control device of the DCS, such as a PC versus a microcontroller. On this emulating computer device, several emulated control devices may be running in parallel. Accordingly, the control devices are emulated in software only, meaning that the processing related behavior of the control devices is imitated by appropriate software programs, called soft emulators. The alternative hardware devices may also be dedicated hardware emulators having the same physical input and output signals as the imitated control devices or data communication means of the DCS, i.e. a hardware emulator is a piece of hardware which mimics the behavior of the original piece of hardware. Such hardware emulators may be used in particular for emulating the data communication means of the DCS, such as field bus systems and I/O devices.

As a result, the above named article presents a combination of simulation and emulation which results in a so called digital factory that can be used for virtual commissioning and therefore as a test environment for FAT.

Figure 1:
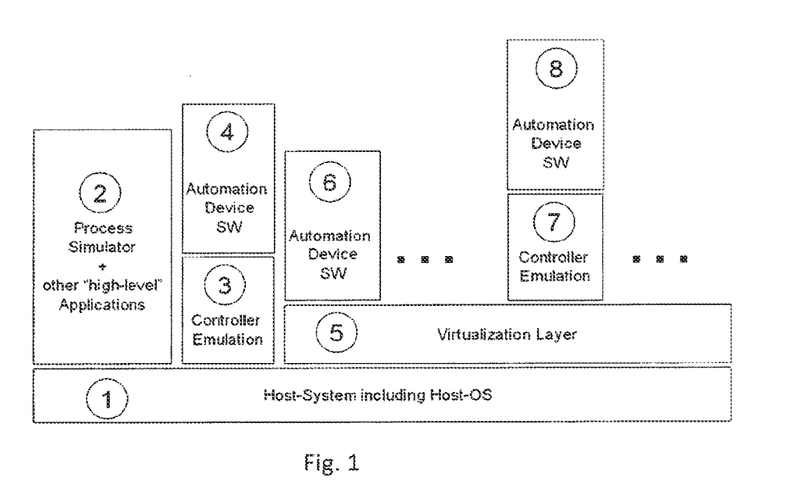
FIG. 1 depicts a realization of a test environment based on virtualization of DCS elements, as known from the prior art.

In DE 10 2010 025 954 A1, another approach for realizing a test environment for FAT of a DCS is presented, as is shown in appended FIG. 1. It is suggested to virtualize each of the DCS elements on a host computer system, in order to be able to simulate the DCS together with a simulation of the production process of the industrial plant on the host computer system. Accordingly, each control device is virtualized by providing a corresponding virtual processor and virtual interfaces on the host computer system, and the data communication means are virtualized via virtual field busses and virtual field bus interfaces implemented on the host computer system. The emulation described in the article by M. Hoernicke et. Al. and the virtualization used in DE 10 2010 025 954 A1 are different techniques for simulating hardware. Emulated hardware is imitated in all details of its behavior by providing for example the complete instruction set of an emulated processor. Virtualized hardware, on the other hand, uses the instruction set of the host computer as far as possible, and only imitates particular instructions which require specific processing activities usually not available on the host computer.

As is further described in DE 10 2010 025 954 A1, the original program of a control device may on one hand be executed directly on its corresponding virtual processor, if the virtual processor and the host computer are alike. In an alternative solution, the virtual processor of a control device may be provided in the form of a hardware emulator, running inside the virtualization environment of the host computer system. Apart from that there may be particular cases where the hardware of the DCS control device differs considerably from the hardware of the host computer system, such as for microcontrollers, so that the hardware emulator of the processor cannot be virtualized without greater effort. In these cases, it is arranged for the hardware emulator to run in parallel with and on the same level as the virtualization layer of the host computer system. In the resulting simulation environment for the DCS, the original software programs may then be executed on their respective purely virtualized, purely emulated or mixed virtualized-emulated processors.

Commonly, the configuration of the above described versions of a digital factory is a highly manual process, as each virtual device and/or emulator has to be configured separately and individually. In large DCS with several sub-systems and a complex periphery, the virtual devices and/or emulators need to be adapted to one another as precisely as possible. Due to the necessary interconnection of the virtual devices and/or emulators, the resulting digital factory may achieve a complexity of almost the same degree as the real industrial plant.

The configuration is done based on the engineering results of the DCS, i.e. the virtual devices and/or emulators are configured with the engineering data generated during the designing, verification and validation of each individual element of the DCS. The pure emulation as presented in above cited article requires in addition that the emulating computer devices which finally execute the soft emulators are configured in hardware and software, in order to fit the requirements for each emulator instance. Besides that, the IT infrastructure needed to physically connect the hardware emulators and the emulating computer devices has to be maintained throughout the use of the digital factory.

Even further, the simulation model of the production processes is assembled manually. The model is integrated into a process model simulator and the connection between the emulators and the process model simulator is configured based on the engineering results, as well.

The described manual configuration of the digital factory involves a lot of effort, not only for the configuration but also for providing the test environment as such. In particular, since the test environment is hardly scalable, manual hardware adaptations may become necessary in case that during engineering more processing power, memory or external interfaces is required. After the FAT, the emulation and simulation infrastructure—which is fixedly adapted to the one digital factory—has to be deconstructed in order to get a clean environment for the next project. If during subsequent engineering steps, elements of the DCS are changed or added and therefore the engineering data are amended, a considerable amount of manual effort is required to implement such amendments in the digital factory in case that they result in the requirement of new emulators.

In order to overcome these drawbacks, the above cited article suggests integrating the different emulators of the digital factory in a virtual environment, so that the test environment becomes scalable and independent of any emulation hardware.

The concept presented in the article is based on the automatic generation of one or multiple virtual machines (VM), where in each of the virtual machines multiple emulators are instantiated. The virtual machines may then be freely distributed across multiple emulating computer devices in order to be executed, where the distribution is carried out using a particularly developed tool. An example for such a tool is given in EP 2 508 904 A1, named framework application.

Figure 2:
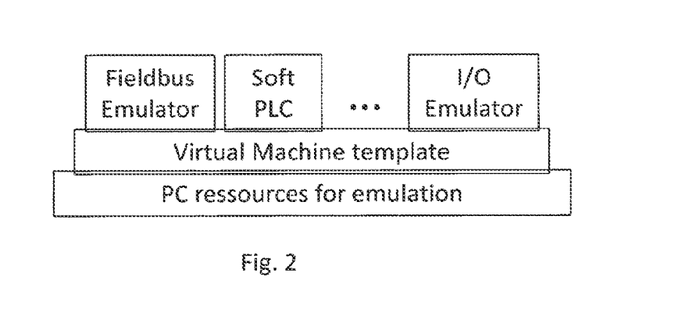
FIG. 2 depicts a realization of a test environment based on a single virtual machine template, as known from the prior art.

The automatic generation of virtual machines is based on one template of a virtual machine which is then duplicated as often as required. In the template, the different types of soft emulators required for the emulation of the control devices and the data communication means of the DCS are installed, as is shown in the example of FIG. 2. The term "Soft PLC" stands for soft emulator for programmable logic controller.

In order to automatically generate the virtual machines and to instantiate the soft emulators, the article by M. Hoernicke et al. suggests exporting the topology of the DCS from the engineering environment of the DCS, identifying from the topology the required emulator types, generating configuration files for those elements of the DCS which are selected by a user to be simulated, determining and generating the required number of virtual machines based on the selected DCS elements under consideration of certain limitations. The limitations include a maximum number of executable instances of one emulator type per virtual machine, a maximum number of available communication interfaces per virtual machine, a maximum number of objects concurrently executed by one emulator, and a maximum available real working memory per emulating computer device. The article by M. Hoernicke et al. additionally suggests configuring the soft emulators in the virtual machines including configuration of their communication interfaces, distributing the virtual machines across the emulating computer devices, starting the virtual machines, and loading the previously generated configuration files of the DCS elements to the respective soft emulators.

SUMMARY

In an embodiment, the present invention provides a system for testing a distributed control system of an industrial plant. The distributed control system includes at least two industrial control devices, each industrial control device configured to control operation of a respective actuating part of the industrial plant during a production process of the industrial plant, and at least one data communication device arranged to connect each of the at least two industrial control devices with at least a corresponding actuator of the industrial plant. The system includes at least one engineering computer that includes an engineering data storage unit for storing engineering data of at least one part of the distributed control system, and at least one human machine interface for manipulating the engineering data. The system also includes at least one remote data processing server connected to the at least one engineering computer via a remote data connection and including an emulating virtual machine on which a soft emulator is installed for emulating one of the at least two industrial control devices and the at least one data communication device. The engineering data includes, a number, a type, and communication configuration information for each of the industrial control devices and the data communication devices of the at least one part of the distributed control system. The at least one remote data processing server installed outside of the industrial plant includes, for each possible type of the at least two industrial control devices and of the at least one data communication means, a separate virtual machine template with an installed soft emulator adapted to the corresponding type, and an orchestration virtual machine. The orchestration virtual machine is configured to retrieve a copy of the engineering data via the remote data connection at pre-defined time intervals or whenever the engineering data is amended, store the copy of the engineering data in at least one remote data storage unit, add or remove emulating virtual machines to or from the at least one remote data processing server by creating or deleting copies of the virtual machine templates so that the number of the resulting emulating virtual machines and the types of their corresponding soft emulators match the number and types contained in the copy of the engineering data, configure the soft emulators in the resulting emulating virtual machines according to the communication configuration information contained in the copy of the engineering data, ensure that the emulating virtual machines are running, further configure the soft emulators in the resulting emulating virtual machines by downloading to them from the engineering data storage unit device at least one of configuration data and executable program code of the corresponding industrial control device or data communication device of the at least one part of the distributed control system, at least if their engineering data have been amended, and communicate with the resulting emulating virtual machines and the at least one or a further human machine interface in order to run the soft emulators of the resulting emulating virtual machines according to simulation commands entered via the at least one or the further human machine interface.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The above described prior art approaches for automatically generating the DCS test environment still entail a certain significant drawback. As described above, the user has to choose which elements of the DCS he wants to simulate. Afterwards, when he has started the automatic generation process, no further interaction is possible to change the test environment. The test environment is fixed and static. It can only be discarded as a whole and fully recreated from the beginning when a different set of DCS elements is to be simulated.

Accordingly, an embodiment of the present invention provides a system and method for testing a DCS of an industrial plant with which the above described drawback can be overcome. A system for testing a DCS of an industrial plant according to an embodiment of the invention comprises at least one engineering computer device which contains an engineering data storage unit storing engineering data of at least one part of the DCS, and at least one human machine interface for manipulating the engineering data. The system further comprises at least one remote data processing server which is connected to the at least one engineering computer device via a remote data connection and which comprises an emulating virtual machine on which at least one soft emulator is installed for emulating one of the at least two industrial control devices and/or the at least one data communication device. The term "engineering," as used herein, can describe all kinds of activities related to designing, verification and validation, implementation, and testing of parts of the DCS or the whole DCS.

According to an embodiment of the invention, the engineering data stored in the engineering data storage unit comprise at least the number, the types, and communication configuration information of the industrial control devices and of the data communication device of the at least one part of the DCS. The at least one remote data processing server is installed outside of the industrial plant and comprises, for each possible type of the at least two industrial control devices and of the at least one data communication device, a separate virtual machine template with an installed soft emulator adapted to the respective type.

A remote data processing server according to an embodiment of the invention further comprises an orchestration virtual machine which is arranged to retrieve a copy of the engineering data via the remote data connection at pre-defined time intervals or whenever the engineering data have been amended, and store the copy in at least one remote data storage unit, where the remote data storage unit belongs to the at least one remote data processing server, add or remove emulating virtual machines to or from the at least one remote data processing server by creating or deleting copies of the virtual machine templates so that the number of the resulting emulating virtual machines and the types of their corresponding soft emulators match the number and types contained in the copy of the engineering data, configure the soft emulators in the resulting emulating virtual machines according to the communication configuration information contained in the copy of the engineering data, ensure that the emulating virtual machines are running, further configure the soft emulators in the resulting emulating virtual machines by downloading to them from the engineering data storage unit device configuration data and executable program code of the corresponding industrial control device or data communication device of the at least one part of the DCS, at least if their engineering data have been amended, and communicate with the resulting emulating virtual machines and the at least one or a further human machine interface in order to run the soft emulators of the resulting emulating virtual machines according to simulation commands entered via the at least one or the further human machine interface.

A corresponding method for testing a DCS of an industrial plant according to an embodiment of the invention includes storing engineering data of at least one part of the DCS in an engineering data storage unit of at least one engineering computer device, providing at least one human machine interface for manipulating the engineering data, connecting at least one remote data processing server to the at least one engineering computer device via a remote data connection, providing on the at least one remote data processing server an emulating virtual machine, and installing on the emulating virtual machine at least one soft emulator for emulating one of the at least two industrial control devices and/or the at least one data communication device.

According to an embodiment of the invention, the method further includes storing in the engineering data at least the number, the types and communication configuration information of the industrial control devices and of the data communication device of the at least one part of the DCS, installing the at least one remote data processing server outside of the industrial plant, and providing on the at least one remote data processing server for each possible type of the at least two industrial control devices and of the at least one data communication device a separate virtual machine template with an installed soft emulator adapted to the respective type.

According to an embodiment of the invention, the following steps are performed by an orchestration virtual machine running on the at least one remote data processing server: retrieving a copy of the engineering data via the remote data connection at pre-defined time intervals or whenever the engineering data have been amended, and store the copy in at least one remote data storage unit, adding or removing emulating virtual machines to or from the at least one remote data processing server by creating or deleting copies of the virtual machine templates so that the number of the resulting emulating virtual machines and the types of their corresponding soft emulators match the number and types contained in the copy of the engineering data, configuring the soft emulators in the resulting emulating virtual machines according to the communication configuration information contained in the copy of the engineering data, ensuring that the emulating virtual machines are running, further configuring the soft emulators in the resulting emulating virtual machines by downloading to them from the engineering data storage unit device configuration data and executable program code of the corresponding industrial control device or data communication device of the at least one part of the DCS, at least if their engineering data have been amended, wherein the downloading operation can be executed directly between engineering data storage unit and emulating virtual machine, or by intermediately storing the device configuration data and the executable program code in the at least one remote data storage unit before loading it into the emulating virtual machine, and communicating with the resulting emulating virtual machines and the at least one or a further human machine interface in order to run the soft emulators of the resulting emulating virtual machines according to simulation commands entered via the at least one or the further human machine interface.

According to an embodiment of the invention, the whole testing of the DCS is performed on one or several remote computer devices, where the remote computer devices are not installed on-site but externally, such as in a private or in a public cloud environment. Accordingly, no in-house IT hardware is required to establish the test environment, so that the effort to maintain and adapt the hardware with respect to the changing needs of the testing is avoided. The remote test environment can be set up and configured automatically via a so called orchestration virtual machine, which is running in the cloud and which uses a remote interface to the computer device or devices where the DCS is currently engineered. The term "orchestration" can refer to all activities in connection with the administration, configuration, starting and stopping, and interacting with the software elements of the test environment. These software elements can all be based on virtual machines, where in the case of public cloud vendors, the virtual machines are provided in a proprietary format of the respective public cloud vendor.

According to an embodiment of the invention, a soft emulator for each device type of the control and communication elements of the DCS is provided and, for each soft emulator, a virtual machine template is prepared on which the soft emulator is installed. Accordingly, each emulator has a separate template, i.e. the emulators are not combined in a single template.

With the orchestration virtual machine (which is permanently connected to the engineering system of the DCS) and with the proposed individual virtual machine templates for the DCS element types, it becomes possible to automatically reflect any changes made to the engineered DCS in the test environment of the DCS.

This can be achieved by arranging the orchestration virtual machine so that it collects the latest engineering data from the engineering system, i.e. the data about the engineering results that are available at some point in time. This can be performed whenever new data is present or at predefined time intervals. The engineering data are copied into the remote test environment, so that they are always kept up to date there.

The orchestration virtual machine can create copies of the virtual machines templates based on the copy of engineering data recently copied into the cloud, thereby creating new virtual machines, where each new virtual machine together with the soft emulator installed on it serves as a simulation device for one control or one communication element newly introduced into the DCS. Recognition of changes also works for the opposite direction, i.e. when a control device or data communication device of the DCS is deleted in the engineering system, the virtual representation of it is also deleted.

The virtual machines created from the virtual machine templates and intended for simulating the DCS can be referred to as emulating virtual machines.

In an embodiment of the invention, the orchestration virtual machine starts the emulating virtual machines and configures them according to the communication related information contained in the copy of the engineering data, such as the IP-Address of the particular DCS element. Afterwards, the configuration of the DCS elements and/or program code to be executed on the corresponding soft emulator is downloaded from the engineering system to the respective emulating virtual machine. Then, the tests of the DCS can be performed immediately.

Accordingly, the present solution avoids the complete recreation of a new test environment in case of a change in the engineered DCS. Instead, the simulation environment in the cloud always reflects the current state of the engineered DCS and represents its up-to-date virtual duplicate.

In an embodiment of the invention, the at least one remote data processing server further comprises a simulation virtual machine containing a runtime environment of a simulation model of the production process of the industrial plant. This allows for the testing of the interaction between DCS and production process of the industrial plant, such as FATs.

The orchestration virtual machine can be arranged to retrieve a copy of an update of the simulation model via the remote data connection whenever the update is available or at pre-defined time intervals, and to load the update into the simulation virtual machine. This means that whenever a new version of the simulation model is created, it can be copied into the simulation virtual machine, thereby not only keeping the virtual representation of the DCS but also the virtual representation of the production process up-to-date.

The orchestration virtual machine may initiate the storing of a previous simulation model before loading the update into the simulation virtual machine. In other words, the old version of the simulation model can be stored in an appropriate storage, e.g. a network attached storage or storage area network, before being overwritten by a new version.

Further, the orchestration virtual machine can be arranged to configure a data communication connection between the resulting emulating virtual machines and the simulation virtual machine based on the communication configuration information of the engineering data, thereby performing a complete automatic setup of a virtual local area network which represents a virtual duplicate of the real physical communication network in the industrial plant between DCS and operating elements of the production process.

The setting-up of the data communication connection between virtual DCS and virtual production process can be based on the engineering data, thereby ensuring that the data communication connection is updated dynamically. In an example, if the elements of the real DCS communicate via an Ethernet connection, each emulating virtual machine gets at first the engineered IP address so that it can afterwards be automatically connected with the simulation virtual machine. The connection between the simulation signals and the corresponding emulation signals is then created based on the communication configuration information stored in the engineering data, so that the correct values can be exchanged between the virtual DCS and the virtual production process during the testing.

Even further, the orchestration virtual machine can be arranged to initiate a distribution of the resulting emulating virtual machines across the at least one remote data processing server. This means that the orchestration virtual machine can either actively allocate the emulating virtual machines to memory and processing devices in a private cloud, or it can request more memory and/or processing power from the cloud provider of a public cloud.

Figure 3:
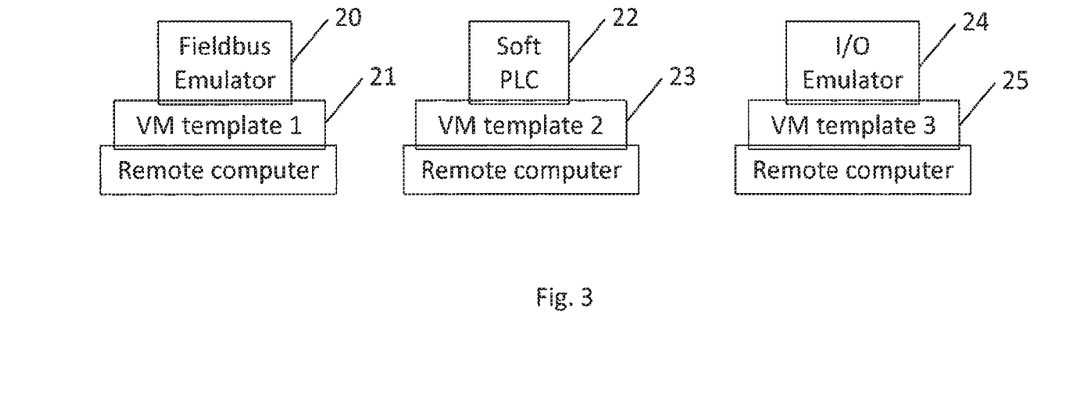
FIG. 3 depicts one virtual machine template for each element of the DCS according to an embodiment of the invention.

In FIG. 3, three different virtual machine templates 21, 23, 25 are shown, where on each of the virtual machine templates 21, 23, 25 a different soft emulator for either a control device (22) or a data communication device (20, 24) of a DCS is installed. Accordingly, in an embodiment of the present invention, for each element of the DCS, a separate soft emulator is provided which has its own individual virtual machine template. As a result, the emulators are no longer combined in a single template as known from the art and as shown in FIG. 2. In this way, it becomes possible to automatically reflect any changes made to the engineered DCS in the test environment of the DCS, by being able to automatically generate and update a virtual representation that fits the engineering results of the DCS at any point in time.

Figure 4:
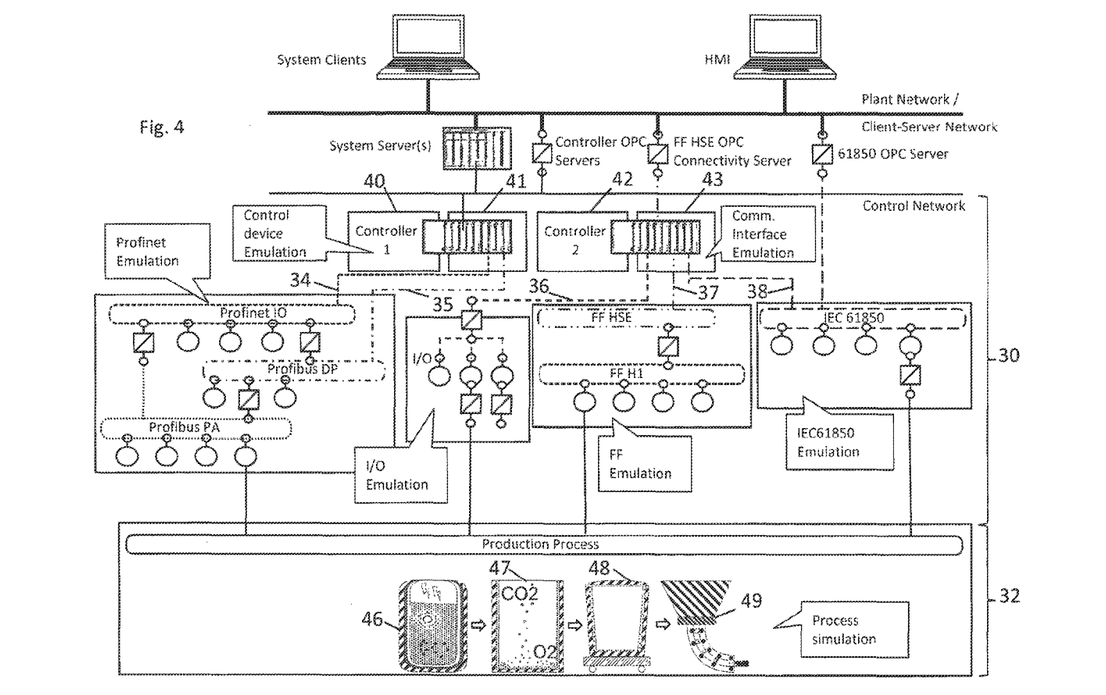
FIG. 4 depicts a communication infrastructure in an industrial plant according to an embodiment of the invention.

FIG. 4 shows an example of a communication infrastructure in an industrial plant. Industrial plants where a DCS is used may belong to all kinds of industry sectors, such as pharmaceutical, chemical, mineral, metals, oil and gas or the power generation industry. The example shown here is a melt shop belonging to the steel industry. Examples for the oil and gas industry may for example include installations used for refinery, ethylene, gasification and gas treatment, or gas liquefaction.

The melt shop comprises, for illustrative purposes, at least one electric arc furnace 47 for melting steel scrap, at least one argon oxygen decarburization unit 48 for processing the molten steel by oxygen (O2) blowing, at least one ladle furnace 49 where for alloying purposes temperature and chemistry adjustments are made and at least one continuous caster 50 for casting slabs, which are then cut to length and transferred to downstream storage and/or rolling mills. Accordingly, the input to the production process 32 performed by the melt shop is steel crap, and the output are steel slabs.

The production process 32 for producing the steel slabs is controlled via a DCS 30 which comprises at least two industrial control devices 40, 42, each of them being arranged to control operation of a respective actuating part of the industrial plant during the production process 32, based on a current operational state of the respective actuating part. The DCS 30 further comprises at least one data communication device, which are here illustrated as fieldbuses based on different protocols, such as Profinet 34, Profubs 35, Foundation Fieldbus 37, and IEC 61850 process bus 38, as well as input-output (I/O) system 35 and communication interfaces 41, 43 of the control devices 40, 42. All these data communication devices are used for communication between the control devices 40, 42 and actuating parts and sensors involved in the production process 32.

Figure 5:
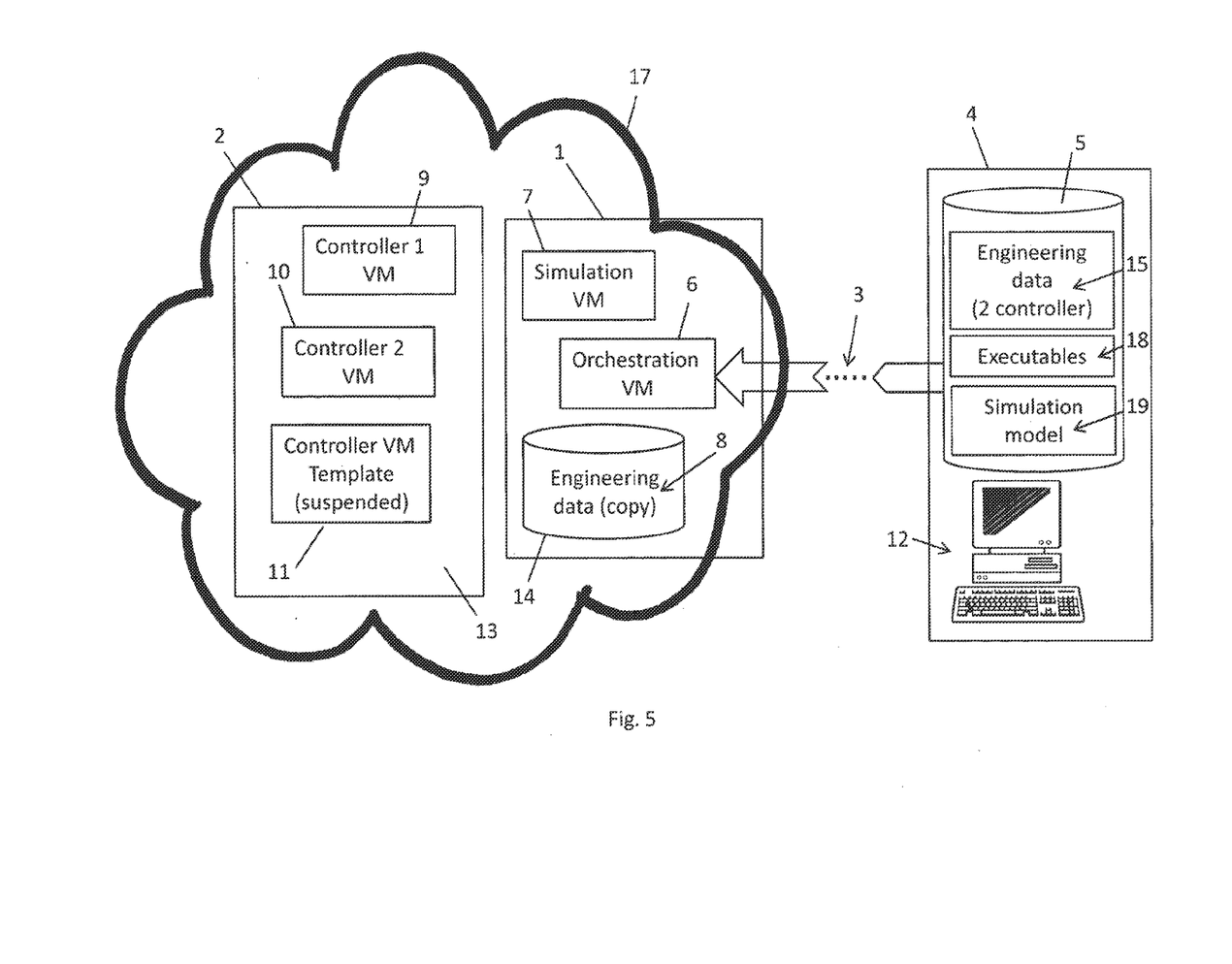
FIG. 5 depicts an example of a system for testing a DCS according to an embodiment of the invention.
Figure 6:
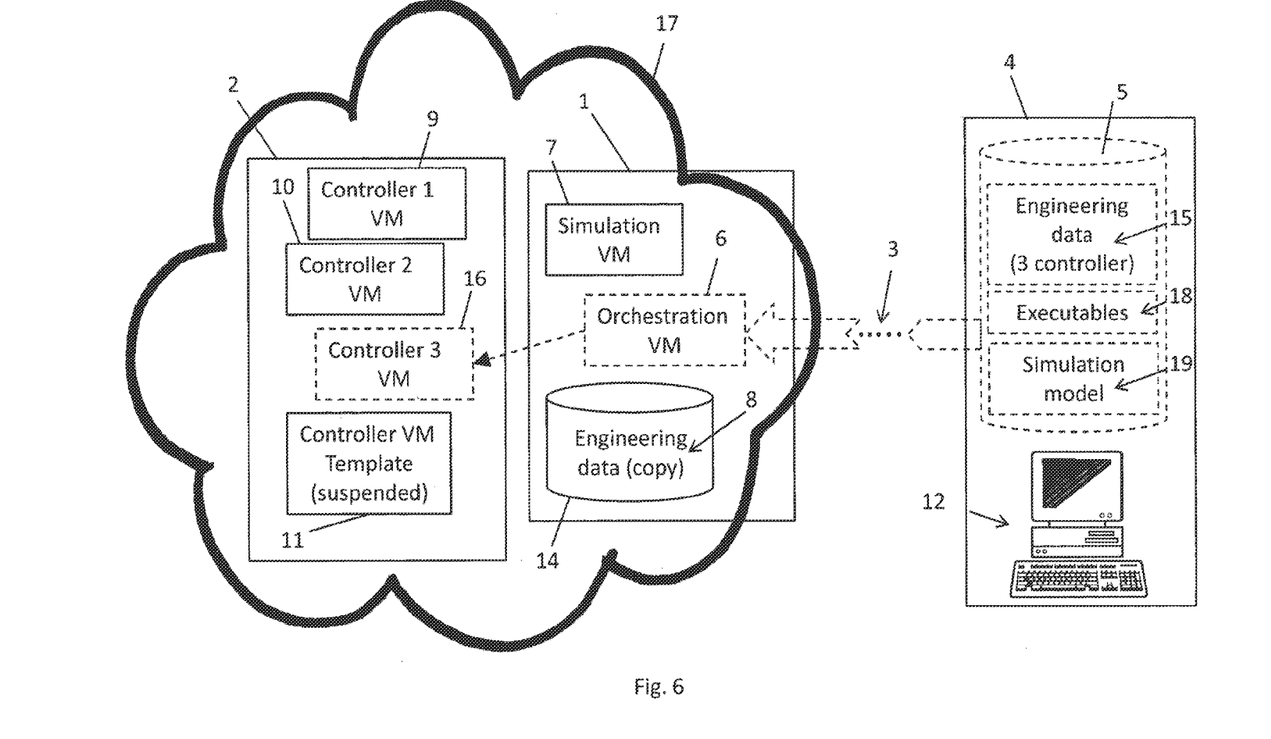
FIG. 6 depicts the system of FIG. 5 with an updated DCS.

In FIGS. 5 and 6 an example is shown for a system with which a test environment may be provided for testing the DCS 30 after it has been engineered and before it is shipped to the actual melt shop. The system comprises at least one engineering computer device 4 with an engineering data storage unit 5 for storing engineering data 15 of at least one part of the DCS 30, and with at least one human machine interface (HMI) 12 for manipulating the engineering data 15. The engineering data 15 of FIG. 5 contain at least the number, the types and communication configuration information of the industrial control devices 40, 42 and of the data communication devices 34 to 38, 41, 43.

The system further comprises at least one remote data processing server 1, 2 which is installed outside of the industrial plant, here in a public cloud 17, and which is connected to the at least one engineering computer device 4 via a remote data connection 3. The at least one remote data processing server 1, 2 comprises for each different type of the control devices 40, 42 and of the data communication devices 34 to 38, a separate virtual machine template, illustrated here by just one virtual machine template for controller 1 and controller 2 of DCS 30, which are of the same device type, namely a PLC. The virtual machine templates are instantiated and permanently kept in a suspended mode, so that they are ready to be used.

In FIG. 5, the whole DCS 30 is represented by emulating virtual machines currently instantiated on the at least one remote data processing server 1, 2, with each emulating virtual machine containing a soft emulator representing a virtual duplicate of one of the elements of the DCS 30 and running executable program code 18 as engineered for the one of the elements of the DCS 30. The emulating virtual machines were created by an orchestration virtual machine 6 using a copy of the engineering data 15 stored in at least one remote data storage unit 14. For the purpose of clear representation of the basic concept, only the emulating virtual machines 9, 10 for the control devices 40, 42 of the DCS 30 are shown here, where on each emulating virtual machine 9, 10 a different one of the two control devices 40, 42 is emulated by a corresponding soft emulator. However, for each of the fieldbuses 34,35, 37, 38 and for the I/O system 35, a separate emulating virtual machine is present on the at least one remote data processing server 1, 2 as well, only they are not shown.

The production process 32 is represented by a simulation model 19 stored on the engineering data storage unit 5. A copy of the simulation model is running on a simulation virtual machine 7 which is instantiated on the at least one remote data processing server 1, 2. The emulating virtual machines 9, 10 and the simulation virtual machine 7 are configured to exchange data in the same way as it is engineered for the interaction between the real DCS 30 and production process 32.

A user can enter commands via HMI 12 in order to simulate the operation and interaction of the elements of the DCS 30 with the production process 32, where the commands are received by the orchestration virtual machine 6 which in turn administers and controls the emulating virtual machines 9, 10 and the simulation virtual machine 7 accordingly. The results of the simulation are sent via remote data connection 3 to HMI 12 for visualization.

FIG. 6 shows the system of FIG. 5 after a change in the engineering data 15 of DCS 30 has been introduced. Instead of two controllers, three controllers are now envisaged for DCS 30. The orchestration virtual machine 6 recognizes the change in the engineering data 15 and performs the following steps: retrieving a copy of the engineering data 15 via the remote data connection 3 as soon as the change in the engineering data 15 was detected, and storing the copy in the at least one remote data storage unit 14, adding an emulating virtual machine 16 to the at least one remote data processing server 1, 2 by creating a copy of the virtual machine template 11; as a result, the number of the resulting emulating virtual machines 9, 10, 16 and the types of their corresponding soft emulators match again the number and types contained in the copy of the engineering data 15, configuring the soft emulator in the newly introduced emulating virtual machine 16 according to the communication configuration information contained in the copy of the engineering data 15; the types of the other controllers remained unamended so that no new template needed to be used for them and no re-configuration of their soft emulators had to take place, ensuring that all the emulating virtual machines are running by starting the newly introduced emulating virtual machine 16, and further configuring the soft emulator in the newly introduced virtual machine 16 by downloading to it from the engineering data storage unit 5 device configuration data (not shown) and executable program code 18 of the corresponding newly introduced controller; in the alternative, the respective executable program code and/or device configuration data could as well be downloaded to all corresponding emulating virtual machines, without particularly checking for which element of the DCS the engineering data 15 have in fact changed.

The result of the above listed steps is illustrated by FIG. 6, where all parts of the system involved in the updating procedure are highlighted by dotted lines. The updated test environment in the public cloud 17 is then again ready for simulation and testing purposes.

After engineering of DCS 30 is fully completed, the orchestration virtual machine 6 can put the finally resulting emulating virtual machines 9, 10, 16 and the simulation virtual machine 7 in a suspended mode. In this way, the resources used for the particular test environment for testing DCS 30 are made available for other applications, such as further engineering projects. The test environment is then still available but in an offline mode.

In addition, the orchestration virtual machine 6 may automatically perform a deconstruction of the test environment and store the resulting emulating virtual machines 9, 10, 16 and the simulation virtual machine 7 in the at least one remote data storage unit 14 for backup reasons. This may be done at a corresponding user request. Even further, the emulating and simulation virtual machines may be extracted from the at least one remote data processing server 1, 2 and stored outside of the cloud, for example in the engineering data storage unit 5. The stored virtual machines may then be resurrected at a later point in time for further testing.

Apart from that, the resulting emulating virtual machines 9, 10, 16 and/or the simulation virtual machine 7 can also be restored in the public cloud 17, and thereby on the at least one remote data processing server 1, 2, in order to be used during monitoring and/or fault diagnosis of the production process 32. In this way, the virtual duplicates of the DCS and the simulation model of the production process can be reused during the actual operation of the industrial plant to serve as a base for a digital observer model of the time-dependent operational behavior of the production process and the DCS, where the digital observer model is used to generate those operational states of the industrial plant which are not available, since they are for example not measured by sensors or currently not accessible.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system for testing a distributed control system of an industrial plant, the distributed control system having at least two industrial control devices, each industrial control device configured to control operation of a respective actuating part of the industrial plant during a production process of the industrial plant, and at least one data communication device configured to connect each of the at least two industrial control devices with at least a corresponding actuator of the industrial plant, the system comprising:
at least one engineering computer having an engineering data storage unit for storing engineering data of at least one part of the distributed control system, and at least one human machine interface for manipulating the engineering data; and at least one remote data processing server connected to the at least one engineering computer via a remote data connection, wherein the engineering data comprises, a number, a type, and communication configuration information for each of the at least two industrial control devices and the at least one data communication device of the at least one part of the distributed control system, and wherein the at least one remote data processing server installed outside of the industrial plant comprises:

for each possible type of the at least two industrial control devices and of the at least one data communication device, a separate virtual machine template with an installed soft emulator adapted to the corresponding type, the virtual machine templates being useable to create separate emulating virtual machines for each of the at least two industrial control devices and the at least one data communication device which operate using separate computer resources and execute the respective installed soft emulators so as to emulate software of the at least two industrial control devices and of the at least one data communication device which is executed in the distributed control system on the respective emulating virtual machines, and an orchestration virtual machine, the orchestration virtual machine configured to:

retrieve a copy of the engineering data via the remote data connection at pre-defined time intervals or whenever the engineering data is amended, store the copy of the engineering data in at least one remote data storage unit, add or remove ones of the emulating virtual machines to or from the at least one remote data processing server by creating or deleting copies of the virtual machine templates so that the number of the resulting emulating virtual machines and the types of their corresponding soft emulators match the number and types contained in the copy of the engineering data, configure the soft emulators in the resulting emulating virtual machines according to the communication configuration information contained in the copy of the engineering data, ensure that the emulating virtual machines are running, further configure the soft emulators in the resulting emulating virtual machines by downloading to them from the engineering data storage unit device at least one of configuration data and executable program code of the corresponding industrial control device or data communication device of the at least one part of the distributed control system, at least if their engineering data have been amended, and communicate with the resulting emulating virtual machines and the at least one or a further human machine interface in order to run the soft emulators of the resulting emulating virtual machines according to simulation commands entered via the at least one or the further human machine interface.

2. The system according to claim 1, wherein the at least one remote data processing server further comprises a simulation virtual machine containing a runtime environment of a simulation model of the production process of the industrial plant.

3. The system according to claim 2, wherein the orchestration virtual machine is arranged to retrieve a copy of an update of the simulation model via the remote data connection, whenever the update is available or at pre-defined time intervals, and to load the update into the simulation virtual machine.

4. The system according to claim 3, wherein the orchestration virtual machine initiates the storing of a previous simulation model before loading the update into the simulation virtual machine.

5. The system according to claim 2, wherein the orchestration virtual machine is arranged to configure a data communication connection between the resulting emulating virtual machines and the simulation virtual machine based on the communication configuration information of the engineering data.

6. The system according to claim 1, wherein the orchestration virtual machine is arranged to initiate a distribution of the resulting emulating virtual machines across the at least one remote data processing server.

7. The system according to claim 1, wherein one of the soft emulators is arranged to emulate at least one communication interface of one of the at least two industrial control devices.

8. The system according to claim 1, wherein the orchestration virtual machine is configured to at least one of put the resulting emulating virtual machines and the simulation virtual machine in a suspended mode or to store the resulting emulating virtual machines and the simulation virtual machine in the at least one remote data storage unit at a corresponding user request.

9. A method for testing a distributed control system of an industrial plant, the distributed control system comprising:

at least two industrial control devices, each of them being arranged to control operation of a respective actuator of the industrial plant during a production process of the industrial plant, and at least one data communication device arranged to connect each of the at least two industrial control devices with at least the respective actuating part of the industrial plant, the method comprising:

storing engineering data of at least one part of the distributed control system in an engineering data storage unit of at least one engineering computer, providing at least one human machine interface for manipulating the engineering data, connecting at least one remote data processing server to the at least one engineering computer device via a remote data connection, storing in the engineering data at least a number, a type, and communication configuration information of the at least two industrial control devices and of the at least one data communication device of the at least one part of the distributed control system, installing the at least one remote data processing server outside of the industrial plant, providing in the at least one remote data processing server for each possible type of the at least two industrial control devices and of the at least one data communication device, a separate virtual machine template with an installed soft emulator adapted to the respective type, the virtual machine templates being useable to create separate emulating virtual machines for each of the at least two industrial control devices and the at least one data communication device which operate using separate computer resources and execute the respective installed soft emulators so as to emulate software of the at least two industrial control devices and of the at least one data communication device which is executed in the distributed control system on the respective emulating virtual machines, and performing, by an orchestration virtual machine running on the at least one remote data processing server:
- retrieving a copy of the engineering data via the remote data connection at pre-defined time intervals or whenever the engineering data have been amended,
- storing the copy of the engineering data in at least one remote data storage unit,
- adding or removing ones of the emulating virtual machines to or from the at least one remote data processing server by creating or deleting copies of the virtual machine templates so that the number of the resulting emulating virtual machines and the types of their corresponding soft emulators match the number and types contained in the copy of the engineering data,
- configuring the soft emulators in the resulting emulating virtual machines according to the communication configuration information contained in the copy of the engineering data,
- ensuring that the emulating virtual machines are running,
- further configuring the soft emulators in the resulting emulating virtual machines by downloading to them from the engineering data storage unit device configuration data and executable program code of the corresponding industrial control device or data communication device of the at least one part of the distributed control system, at least if their engineering data have been amended, and
- communicating with the resulting emulating virtual machines and the at least one human machine interface or a further human machine interface in order to run the soft emulators of the resulting emulating virtual machines according to simulation commands entered via the at least one human machine interface or the further human machine interface.

10. The method according to claim 9, wherein the virtual machine templates are instantiated and permanently kept in a suspended mode.

11. The method according to claim 9, wherein the resulting emulating virtual machines and the simulation virtual machine are extracted from the at least one remote data processing server and stored in the engineering data storage unit.

12. The method according to claim 11, wherein at least one of the resulting emulating virtual machines and the simulation virtual machine is restored on the at least one remote data processing server in order to be used during at least one of monitoring or fault diagnosis of the production process.

* * * * *